June 8, 1926. 1,588,339
R. R. SEARLES
SPRING END CONNECTION
Filed June 27, 1925  2 Sheets-Sheet 1

INVENTOR
Raymond R. Searles
BY
Mitchner Bechet
ATTORNEYS

June 8, 1926.  1,588,339
R. R. SEARLES
SPRING END CONNECTION
Filed June 27, 1925  2 Sheets-Sheet 2
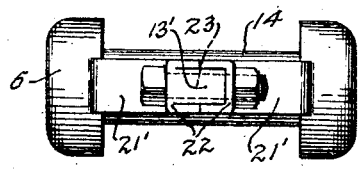
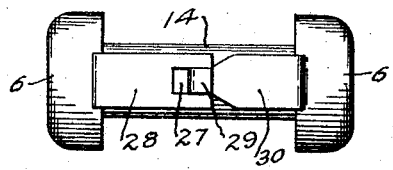
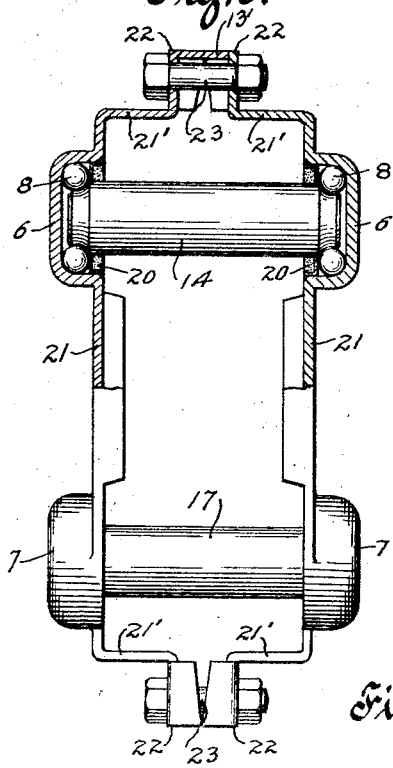
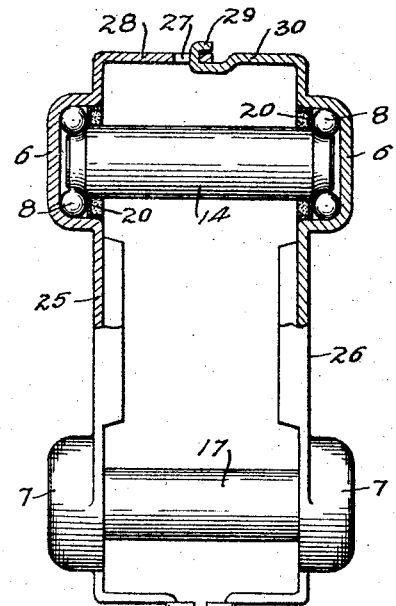
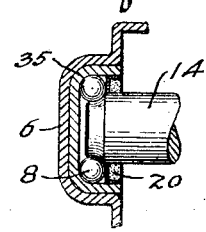
INVENTOR
Raymond R. Searles
BY
Mitchell Bechet
ATTORNEYS Patented June 8, 1926.

1,588,339

UNITED STATES PATENT OFFICE.

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

SPRING-END CONNECTION.

Application filed June 27, 1925. Serial No. 39,955.

My invention relates to an anti-friction spring shackle for connecting a vehicle frame to a vehicle spring.

It is the principal object of the invention to provide an anti-friction spring shackle which will be relatively simple and cheap to manufacture and which may be readily and quickly assembled.

It is a further object to provide an anti-friction spring shackle in which the shackle links are connected to each other at the ends and beyond the points of connection of the shackle links to the spring and frame.

It is a more specific object to provide an anti-friction spring shackle formed of sheet metal in which the parts have integral struck up strengthening means and integral struck up bearing seats for anti-friction bearing members thereon and which may be connected to each other at the ends and beyond the bearing seats.

It is still another object to provide an anti-friction spring shackle in which the two shackle plates are integrally secured to each other at one end and detachably secured to each other at the opposite end. Other objects will appear as the specification proceeds.

Briefly stated, in the preferred form of the invention I employ sheet metal shackle links having seats for anti-friction bearing members struck up thereon. The links are preferably connected to each other at the ends, that is, beyond the seats for the anti-friction bearing members. If desired, strengthening means such as ribs or flanges may be formed on the links at appropriate places for strengthening the same, so as to withstand strains when in use.

In the drawings which show for illustrative purposes only, preferred forms of the invention—

Fig. 4 is a top plan view illustrating a slightly modified form of shackle;

Fig. 5 is an end view in partial section of the form shown in Fig. 4;

Fig. 6 is a view similar to Fig. 4 but illustrating still another modified form;

Fig. 7 is an end view in partial section of the form shown in Fig. 6;

Fig. 8 is a fragmentary sectional view illustrating a variation.

Figure 1:
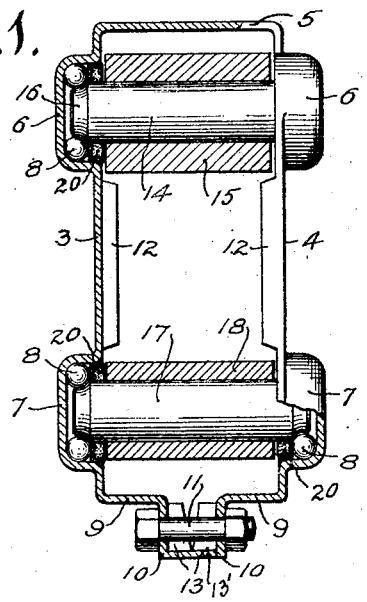
Fig. 1 is an end view in partial section of a spring shackle embodying features of the invention.

In that form of the invention shown in Figs. 1 to 3, 3—4 indicate shackle links preferably formed of sheet metal and integrally connected together at one end by means of the end connection or bridge portion 5. It is preferable to form both links 3—4 from a single blank of sheet metal which may be formed as hereinafter described, and afterwards bent into the proper shape. Each link has bearing seats for anti-friction bearing members thereon, intermediate the ends thereof and in the form shown, these bearing seats are cups 6—7 which receive anti-friction bearing members such as balls 8.

The free ends of the links 3—4 are detachably connected together and in the form shown the ends are bent inwardly toward each other as indicated at 9—9, and arms 10—10 project outwardly from the bends 9—9 and a through bolt or the like 11 serves to secure the free ends together. If desired strengthening members such as webs or flanges 12—12 may be formed on the shackle links intermediate the bearing seats thereon. Flanges 13—13 may also be formed on the projecting ends 10 as clearly shown in the drawing. Flanges 13'—13' on the link ends may abut each other to space the links apart to avoid straining the bearings.

14 indicates a shackle pin rigidly secured in the frame 15 of a motor vehicle the ends of the pin extending laterally beyond the sides of the frame and having bearing seats such as 16 thereon, complementary to the bearing seats in the cups 6—6 and resting upon the anti-friction bearing members 8 therein.

A similar pin 17 may be secured in the eye 18 of the spring of a motor vehicle, and the ends of the pin 17 project beyond the sides of the spring and have bearing seats 19 for anti-friction bearing members in the complementary bearing seats 7—7.

Figure 2:
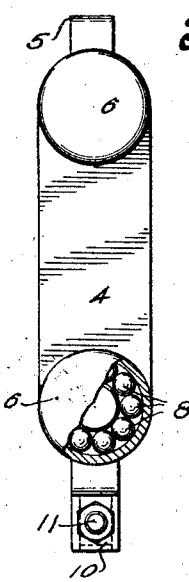
Fig. 2 is a side view in partial section of that form of the invention shown in Fig. 1.
Figure 3:
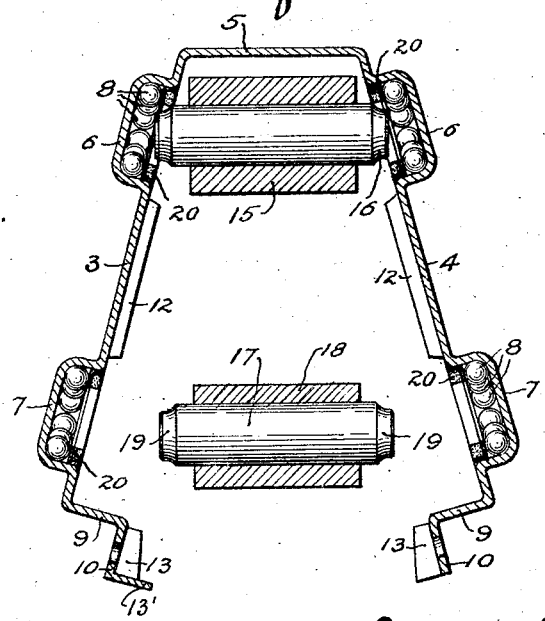
Fig. 3 is a sectional view of the form shown in Fig. 1 and illustrating the method of assembling.

In this disclosure, the bearing cups 6—7 are substantially filled with bearing balls as plainly indicated in Figs. 2 and 3. When the cups are substantially filled with balls, it is obvious that the balls themselves form arches and are prevented from falling out radially inwardly. Retaining means in the form of suitable dust rings 20—20 may be secured in the bearing cups on the shackle links and these cups serve to prevent the balls from falling out endwise of their respective cups and also prevent the entry of dust and dirt into the bearings.

When the shackle shown in Figs. 1 to 3 is to be assembled, the two shackle links 3—4 are spread substantially as shown in Fig. 3, so that the two links may pass over the respective pins 14 and 17 held in the frame and spring. When the parts are substantially as shown in Fig. 3, the links 3—4 are bent together and secured in that position as by means of the bolt 11 shown in Fig. 1. The bridging member 7 is bendable and permits the ready assembly and disassembly of the shackle.

In the modification shown in Figs. 4 and 5 the links 21—21 are provided at opposite ends with inturned portions 21'—21' and angular portions 22—22 through which through bolts 23 pass for holding the links together. The other features of the invention are substantially the same as previously described in connection with Figs. 1-3. The invention shown in Figs. 4 and 5, however, does not necessarily depend upon the flexibility or bendability of the bridging portion 21'—21' and the links may be assembled by removing bolts 23—23 and placing the links in position individually and independently of each other.

In the modification shown in Figs. 6 and 7 the links 25—26 are substantially similar to those shown in Figs. 4 and 5 except that the links are connected together at one end by different means. In this form I employ a hinge connection which may be conveniently formed by making a slot or aperture 27 in one of the bridging members 28 and forming a suitable hook 29 on the other bridging member 30. This hinged connection serves to hold the two links together at one end while a through bolt 31 serves to hold the opposite ends of the links together. This form of the invention is preferably assembled substantially the same as that shown in Figs. 1 to 3 but in the construction shown in Figs. 6 and 7, the bridging member need not necessarily be flexed for the hinged connection permits an opening up of the shackle links to permit of ready assembly.

In all of the forms described the anti-friction bearing members are shown as bearing directly upon the inner surfaces of the cup members forming seats in the links. It is obvious that the constructions may be varied as shown in Fig. 8 by placing a suitable race ring such as a cup 35 in the bearing cup such as 6. An independent bearing cup while increasing the cost of the construction slightly tends to reduce wear on the shackle links and strengthens the same to some extent.

It will be seen that by means of the constructions herein disclosed a shackle may be formed of sheet metal stamped to form. The construction will be cheap to manufacture and will be easy to assemble. The anti-friction bearing members serve to reduce friction to such extent that lubrication will seldom if ever become necessary. The shackle links are held together by one or, in some forms, two bolts which are located beyond the bearing surfaces and the shackles may thus be made considerably shorter than when the connection between the links lies between the pins on the spring and frame.

While the invention has been described in some detail, I do not wish to be limited to the forms shown as changes may be made within the scope of the invention as defined in the appended claims.

I claim:

1. In an anti-friction spring shackle, a pair of sheet metal shackle links having struck up bearing seats for anti-friction bearing members thereon, means for connecting said shackle links at the end and longitudinally beyond the bearing seats thereon, and a second means for connecting said shackle links together.

2. In an anti-friction spring shackle, sheet metal side links connected together at the ends said side links having struck up bearing seats for anti-friction bearing members at points intermediate the points of connection of said links to each other.

3. In an anti-friction spring shackle, shackle links connected together at the ends, said shackle links having bearing seats for anti-friction bearing members intermediate the points of connection of said links to each other.

4. In an anti-friction spring shackle, sheet metal shackle links, each link having a pair of struck up bearing seats for anti-friction bearing members intermediate the ends thereof, struck up strengthening means on said side links intermediate the bearing seats thereon, and means for connecting said shackle links at the ends beyond the bearing seats thereon.

5. In an anti-friction spring shackle, sheet metal shackle links connected to each other at the ends, bearing seats for anti-friction bearing members formed on said links intermediate the ends thereof and strengthening flanges on said links intermediate the bearing seats thereon.

6. In an anti-friction spring shackle, sheet metal shackle links connected to each other at one end, seats for anti-friction bearing members on each of said shackle links and intermediate the ends thereof, and a through bolt for connecting the other ends of said links together.

7. An anti-friction spring shackle including sheet metal side links connected to each other at the ends thereof, seats for anti-friction bearing members on said shackle links intermediate the ends thereof, the means of connection between said shackle links at one end thereof comprising a through bolt extending through said shackle links.

8. In an anti-friction spring shackle, sheet metal side links connected to each other at opposite ends, each of said links having a pair of struck up cup members for receiving anti-friction bearing members, said cup members being located intermediate the points of connection of said links to each other, a shackle pin to be connected to a vehicle frame and extending between the cup members on opposite shackle links, a second shackle pin to be connected to a vehicle spring and located between said other cup members on opposite shackle links, and anti-friction bearing members interposed between said shackle pins and said cup members.

9. In an anti-friction spring shackle, shackle links, connecting means for said links, said links and connecting means forming a closed body, said links having bearing seats for anti-friction bearing members intermediate the connecting means, and means for spacing the links apart to avoid straining the bearings.

RAYMOND R. SEARLES.